(12) United States Patent
Trickel

(10) Patent No.: US 7,293,299 B2
(45) Date of Patent: Nov. 13, 2007

(54) TANK FLUSH SYSTEM

(76) Inventor: Richard W. Trickel, 37088 Bunkhouse Rd., Crosslake, MN (US) 56442

( * ) Notice: Subject to any disclaimer, the term of this patent is extended or adjusted under 35 U.S.C. 154(b) by 323 days.

(21) Appl. No.: 10/946,707

(22) Filed: Sep. 22, 2004

(65) Prior Publication Data

US 2006/0059611 A1   Mar. 23, 2006

(51) Int. Cl.
    *E03D 1/00*   (2006.01)
(52) U.S. Cl. .................... 4/321; 4/323; 134/166 R; 285/133.11
(58) Field of Classification Search .................... 4/300, 4/321, 347, 210, 218, 219, 226.1, 255.04, 4/323, 458, 459, 475, 479, 482; 134/22.11, 134/22.12, 166 R; 285/274, 133.11
See application file for complete search history.

(56) References Cited

U.S. PATENT DOCUMENTS

| | | | | |
|---|---|---|---|---|
| 3,002,197 A | * | 10/1961 | Tillman | 4/226.1 |
| 3,811,462 A | * | 5/1974 | Feliz | 285/274 |
| 4,667,351 A | * | 5/1987 | Williams | 4/323 |
| 4,786,088 A | * | 11/1988 | Ziu | 285/133.11 |
| 5,573,187 A | * | 11/1996 | Proctor | 134/167 R |
| 5,584,079 A | * | 12/1996 | Wong et al. | 4/226.1 |
| 5,743,569 A | * | 4/1998 | Deters et al. | 285/3 |
| 5,988,188 A | * | 11/1999 | Born | 134/22.11 |
| 6,038,710 A | * | 3/2000 | Baron | 4/321 |
| 2002/0189673 A1 | * | 12/2002 | Schoellhorn et al. | 137/355.12 |

* cited by examiner

*Primary Examiner*—Tuan Nguyen
(74) *Attorney, Agent, or Firm*—Vidas, Arrett & Steinkraus

(57) ABSTRACT

A Recreational Vehicle tank flush system is provided in which the existing vent pipe to the blackwater tank is modified by attaching an introduction tee which provides a hookup to a source of flushing water and to a hose and sprayer which may be hung just inside the top of the tank.

1 Claim, 6 Drawing Sheets

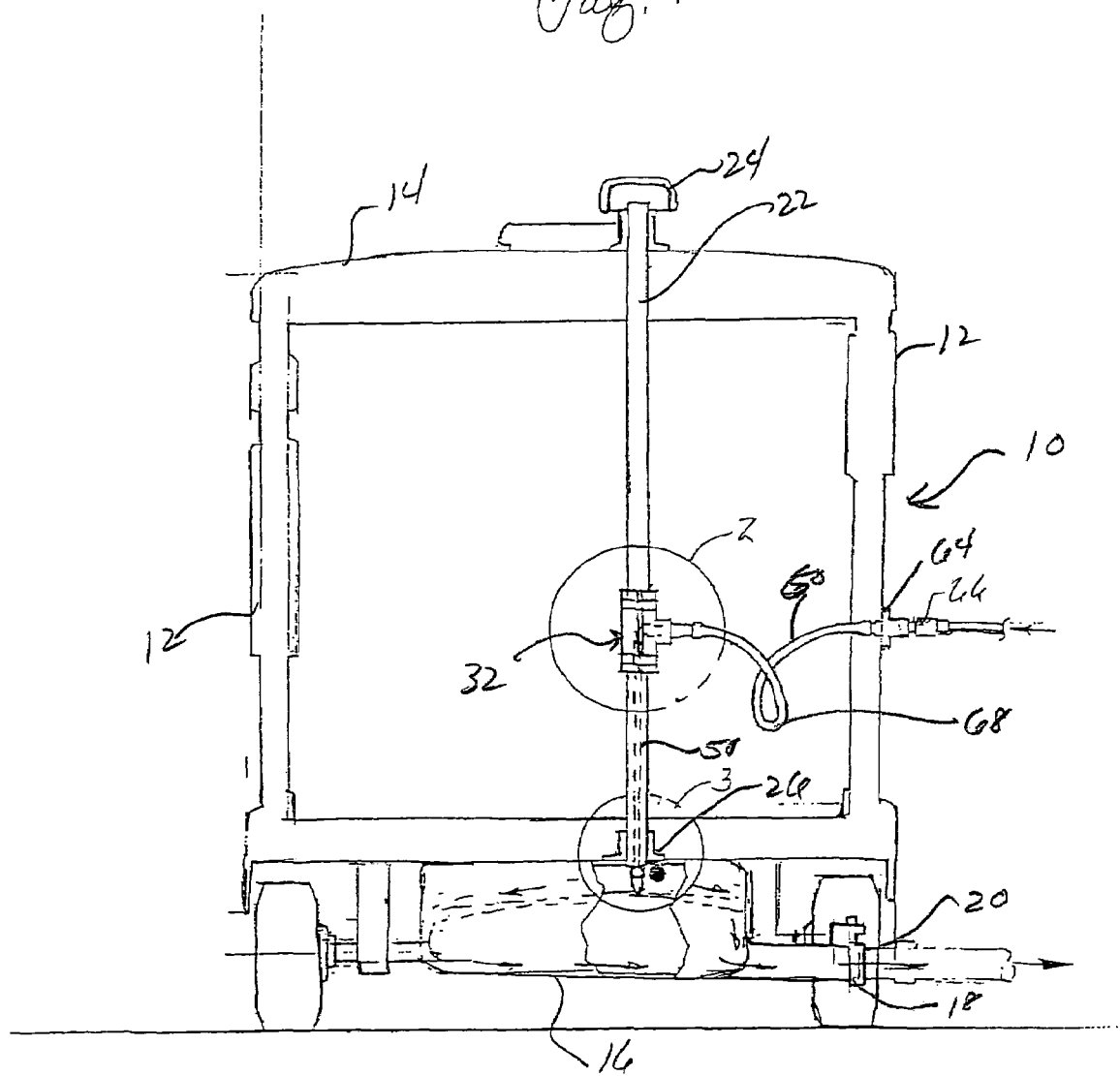

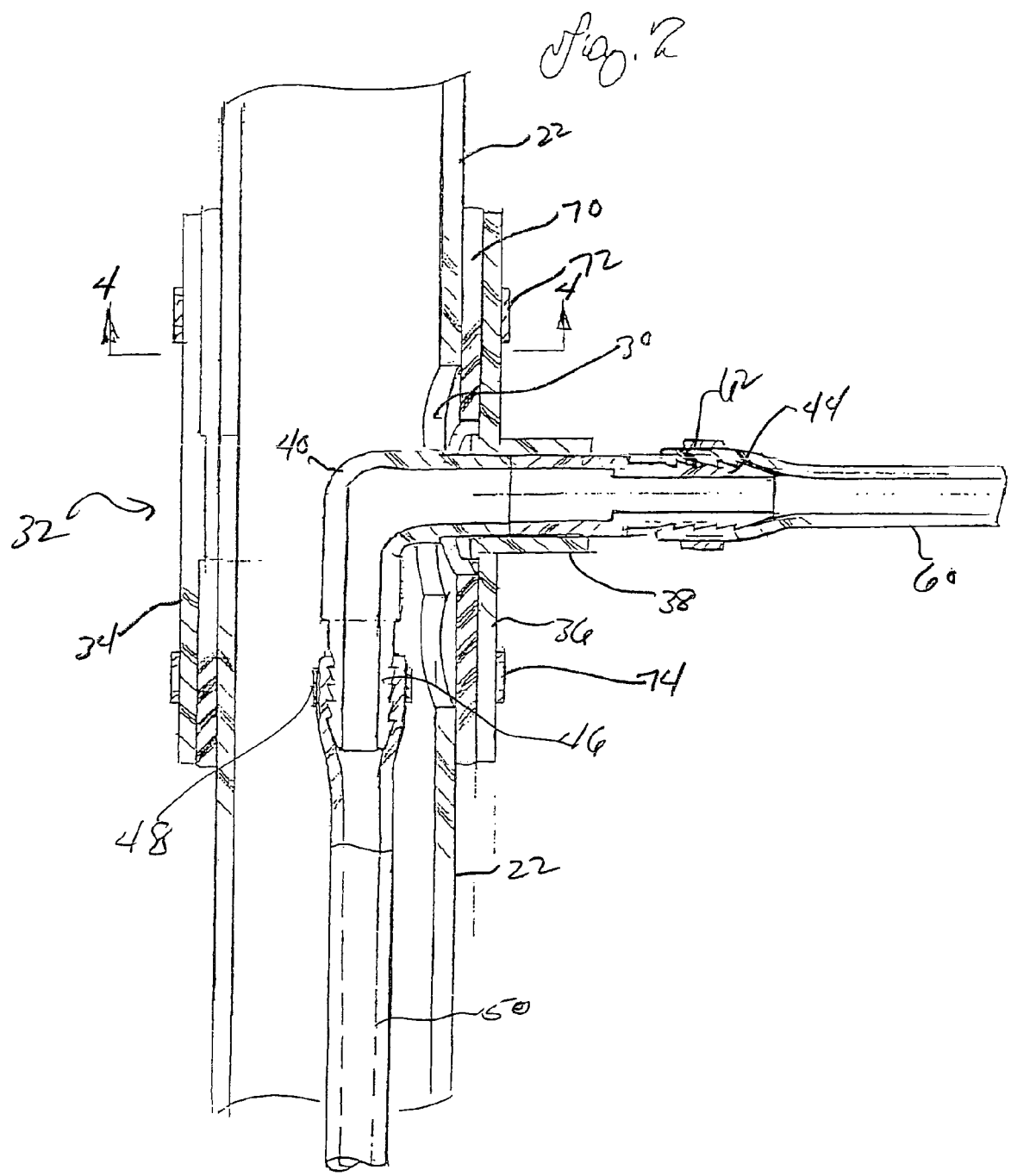

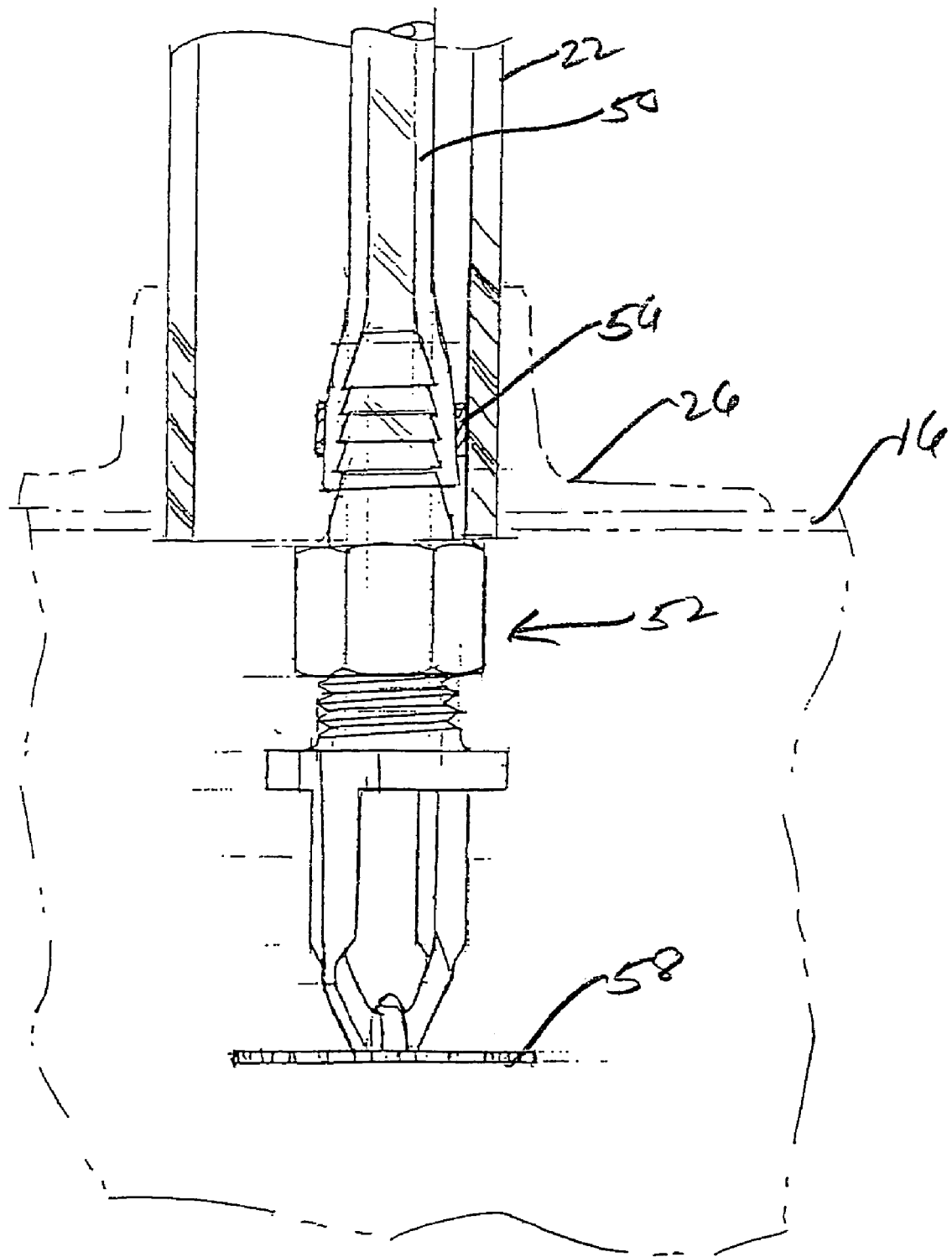

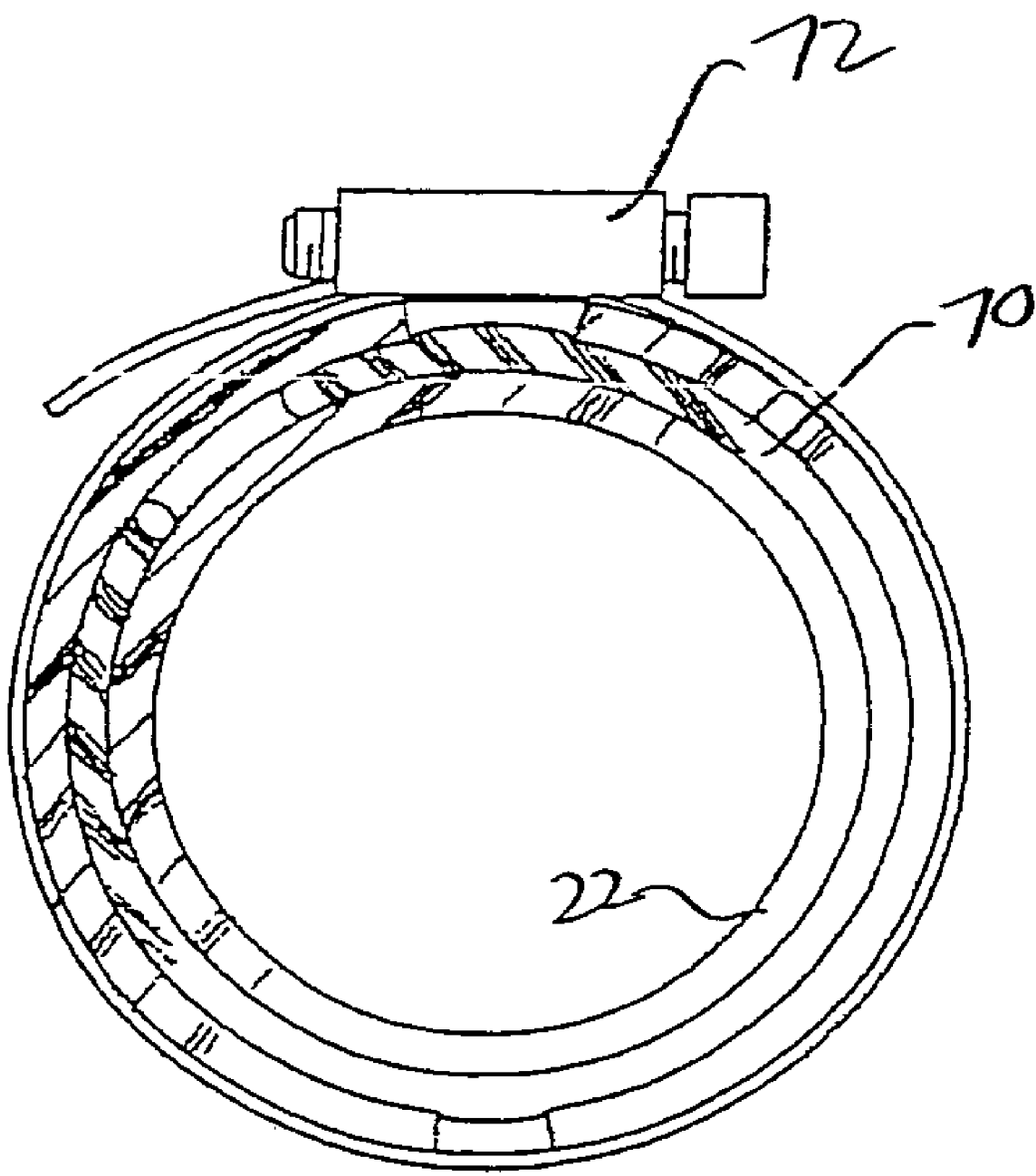

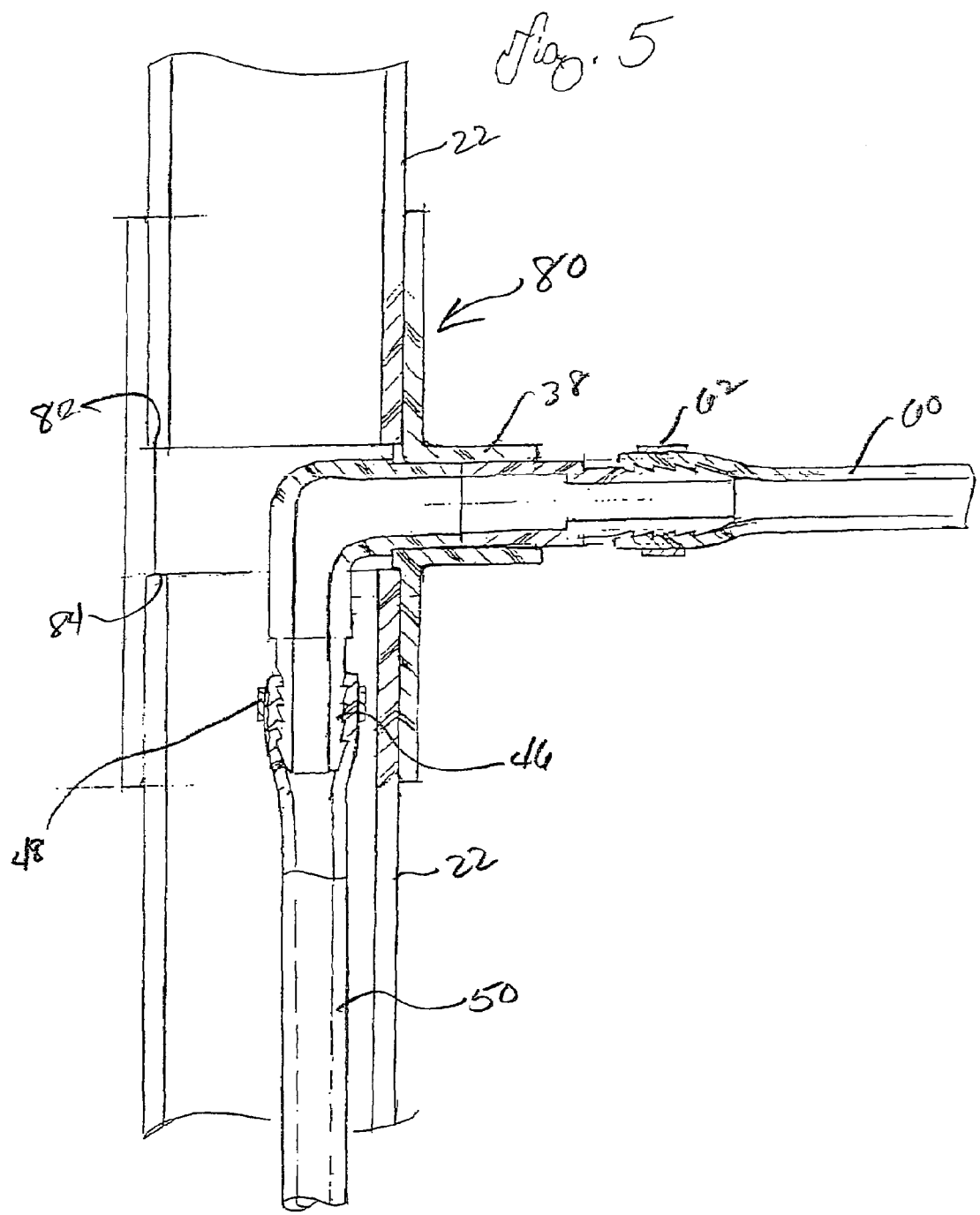

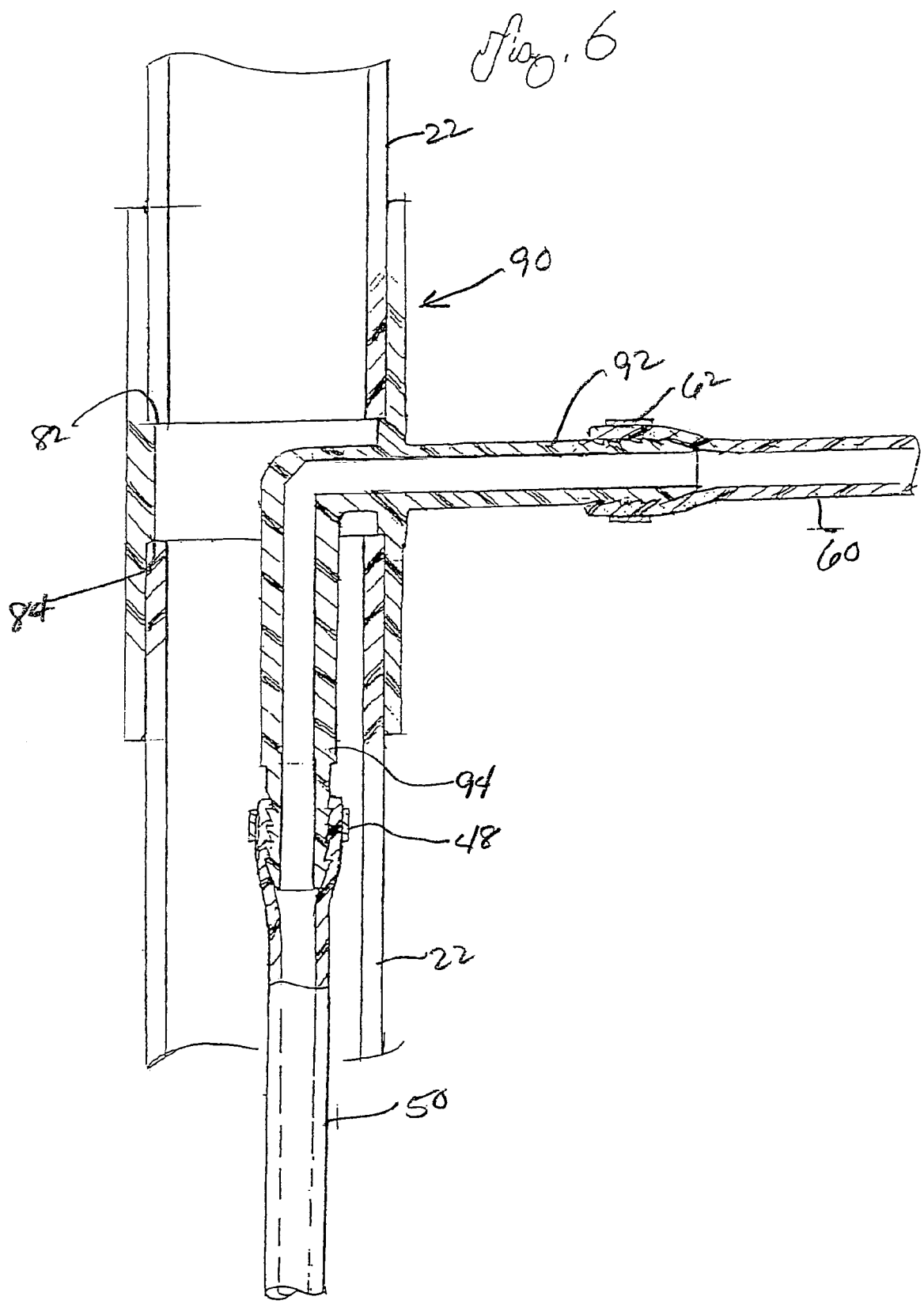

TANK FLUSH SYSTEM

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to waste tanks, often referred to as black water tanks which collect human waste. Such tanks are often built into recreational vehicles (RVs). Normally, after the tanks fill up they must be drained by attaching an outlet valve to a suitable collection facility. Unfortunately, while this empties the black water tank sufficiently for it to be reused, it does not clean the tank to prevent build-up, odors and fouling of tank quantity transmitters.

Currently, owners of such tanks may attempt to clean their black water tanks by connecting an external hose to a water source, dragging the hose to the RV toilet, pushing the probe through the toilet and running water in an attempt to flush the tank. In addition, the hose and probe are now horribly fouled and may represent a risk of contaminating the clean water source. The dirty hose and probe must also be stored.

Another method used is to drill a hole through the side of the black water tank and install a nozzle to flush and deodorize the tank. This is invasive and could cause a leak in the tank.

A final method is to use the existing drain valve and direct water back through the drain into the waste tank to flush and rinse. Again, this involves a new hose that will be fouled after use and must be stored. Also, very little washing occurs unless the pressurized water has a straight route to the tank.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

BRIEF SUMMARY OF THE INVENTION

The invention provides an elegantly simple, effective and safe system to clean black water tanks without any of the detriments of prior approaches. The tank flush system of the invention involves using the vent stack from the tank and builds in a fitting that can be fed clean water from an outside source to the fitting and down into the tank where a spray head directs cleaning water exactly where desired. Retrofitting an existing R/V may be done by cutting into the vent stack and inserting the device. It is a completely built in system with nothing to store.

BRIEF DESCRIPTION OF THE DRAWINGS

A detailed description of the invention is hereafter described with specific reference being made to the drawings in which:

FIG. 1 is a cross-sectional view of a recreational vehicle showing the inventive tank flush system;

FIG. 2 is an enlarged view of the tank flush system of FIG. 1;

FIG. 3 is an enlarged view of the sprayer of the tank flush system as it is presented in a black water tank;

FIG. 4 is a cross-sectional view of the tank flush system fittings through line 4-4 of FIG. 2;

FIG. 5 is a cross-sectional view of the tank flush system similar to FIG. 2 in which the components may be solvent welded together;

FIG. 6 is a cross-sectional view of a tank flush system similar to FIG. 2 in which the fittings are presented as a one piece introduction tee suitable for OEM use.

DETAILED DESCRIPTION OF THE INVENTION

FIG. 1 shows a stylized Recreational Vehicle or RV 10. Such RVs include sidewalls 12, roof 14 and a blackwater tank 16 beneath a toilet which is not shown. The blackwater tank 16 includes a drain 18 to which an external drain connection 20 may be made. The tank 16 includes a vent stack which includes a vent pipe 22 which leads to a vent cap 24, typically on roof 14 to exhaust any noxious gases produced in the tank 16. Typically, vent pipe 22 enters tank 16 via flange fitting 26.

FIG. 2 shows how an existing vent pipe has been modified to include a side opening 30. A clamp-on split side introduction Tee 32 composed of a back half 34 and a mating inlet half 36 having an inlet boss 38 is mated with an elbow fitting 40 that includes a tubing inlet 44 and a tubing outlet 46. The elbow fitting 40 fits snugly within the inlet boss 38 and descends downwardly within the vent pipe 22 when so fitted. Prior to fitting, a flexible tube 50 is secured to tubing outlet 46 by any suitable manner, such as a clamp 48.

FIG. 3 shows the flexible tube 50 as it descends downwardly into blackwater tank 16. The free end of tube 50 is attached to a spray fitting 52 which typically includes a tubing nipple 54 to which tube 50 may be secured, as by a clamp 56. The sprayer 52 may include a lower diverter disk 58 which water would hit and deflect evenly out to the sides of the blackwater tank 16 to rinse any material to the bottom so it may exit the tank via drain 18. The sprayer 52 may be similar to fire sprinkler system spray heads which are positioned on ceilings in buildings. The sprayer 52 may be of any construction which directs water from tube 50 outwardly to the sides of tank 16.

The tubing inlet 44 of Tee 32 is connected to another tube 60 and secured by a clamp 62 or other securement method. As best shown in FIG. 1, the tube 60 exits the sidewall 12 of RV 10 and is suitably secured to the sidewall via a coupling flange 64. A quick disconnect fitting 66 or other suitable fitting may be used to connect the tank flush system to a source of water. Note that tube 60 may be longer than needed to provide a descending loop that would retain residual water and form a trap 68 to prevent any gases from exiting through fitting 66. Alternatively, if side venting of gas is not a problem a simple straight tube may be employed.

FIGS. 2 and 4 show the introduction tee 32 with an elastomeric gasket 70 and a pair of clamps 72, 74 to secure the back half 34 to the inlet half 36 and thereby seal the opening 30. Other mechanisms may be used to assemble the tee 32 to the vent pipe 22 as are well known in the art.

FIG. 5 shows the introduction tee of the invention in an alternative construction in which the tee 80 is a single molded tee as in conventional plumbing tees. It includes the inlet boss 38 and elbow fitting 40 as previously described. However, with a single piece tee 80, the vent pipe 22 is cut and a section is removed such that the tee 80 may be inserted therebetween with conventional shoulders 82, 84 providing the limit for insertion of the cut ends of vent pipe 22. They may be socket welded or otherwise sealed depending on the materials of the vent pipe and tee 80.

Finally, FIG. 6 shows a tee 90 formed to include a tee with integral inlet 92 for connection to tube 60 and a tubing outlet 94 for attachment to tube 50. Tee 90 includes shoulders 82, 84 as previously described. As shown, tubing outlet 94 preferably extends beyond the end of tee leg 98 to make it easier to secure tube 50 to outlet 94. This form of the invention may be readily incorporated into either OEM construction or existing RV units.

The invention utilizes the existing vent pipe to provide a simple tank flush system in which water from outside of the RV may be directed from above the blackwater tank into the tank and out toward its walls to flush out the tank. It does not require an additional opening into tank 16 and provides a contamination and leak free system for supplying water to the tank 16. No hoses are contaminated and fouled by the cleaning system as described in comparison to previous approaches.

The introduction tees 32, 80 and 90 of the invention all provide a mechanism to connect to the vent pipe 22 and provide a connection to external water which may be directed down through the vent pipe 22 and present a sprayer 52 within tank 16.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

The invention claimed is:

1. In a recreational vehicle of the type including sidewalls and a roof, a blackwater tank and a vent pipe between said tank and said roof, the improvement comprising:
   (a) an introduction tee interposed to said vent pipe to provide a side connection to a source of inlet water and to provide a descending connection within said vent pipe to a outlet sprayer; and
   (b) an outlet sprayer connected to said introduction tee descending connection such that water may exit said sprayer and be directed out toward sidewalls of said tank, wherein said outlet sprayer includes a diverter to direct water outwardly and wherein said introduction tee is connected to tubing that is connected to a water inlet fitting in a sidewall of said vehicle.

* * * * *